United States Patent
Mrozinski et al.

[11] Patent Number: 5,989,698
[45] Date of Patent: *Nov. 23, 1999

[54] COATED POROUS MATERIALS

[75] Inventors: James S. Mrozinski, Oakdale; Malcolm B. Burleigh, St. Paul; Philip D. Radovanovic, Minneapolis; Brian D. Johnson, Woodbury, all of Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/798,320

[22] Filed: Feb. 10, 1997

[51] Int. Cl.$^6$ .................................................. B32B 3/26
[52] U.S. Cl. .................................... 428/315.7; 428/319.3; 428/334
[58] Field of Search ............................. 428/304.4, 315.5, 428/320.2, 321.1, 327, 334, 315.7, 319.3

[56] References Cited

U.S. PATENT DOCUMENTS

| | | |
|---|---|---|
| 3,484,281 | 12/1969 | Guenthner et al. . |
| 3,595,732 | 7/1971 | Tingerthal . |
| 4,382,798 | 5/1983 | Suzuki et al. .......................... 8/94.1 R |
| 4,483,900 | 11/1984 | Goldfarb . |
| 4,539,256 | 9/1985 | Shipman .............................. 428/315.5 |
| 4,579,924 | 4/1986 | Schwartz et al. . |
| 4,613,544 | 9/1986 | Burleigh . |
| 4,726,989 | 2/1988 | Mrozinski . |
| 4,824,718 | 4/1989 | Hwang . |
| 4,833,026 | 5/1989 | Kausch . |
| 4,863,792 | 9/1989 | Mrozinski . |
| 4,954,256 | 9/1990 | Degen . |
| 5,116,650 | 5/1992 | Bowser . |
| 5,120,594 | 6/1992 | Mrozinski . |
| 5,208,313 | 5/1993 | Krishnan . |
| 5,217,802 | 6/1993 | Scarmoutzos . |
| 5,260,360 | 11/1993 | Mrozinski . |
| 5,286,279 | 2/1994 | Wu .............................................. 95/45 |
| 5,286,382 | 2/1994 | Scarmoutzos et al. . |
| 5,443,727 | 8/1995 | Gagnon . |
| 5,460,872 | 10/1995 | Wu et al. ............................. 428/304 X |
| 5,506,047 | 4/1996 | Hedrick et al. ....................... 428/307.7 |
| 5,523,118 | 6/1996 | Williams . |
| 5,543,200 | 8/1996 | Hargis et al. ............................ 428/122 |
| 5,554,414 | 9/1996 | Moya et al. . |

FOREIGN PATENT DOCUMENTS

| | | |
|---|---|---|
| 0 218 909 | 4/1987 | European Pat. Off. . |
| 615 779 A1 | 9/1994 | European Pat. Off. . |
| 648 889 A1 | 4/1995 | European Pat. Off. . |
| 2 154 551 | 5/1973 | France . |
| 1 011 976 | 12/1965 | United Kingdom . |

OTHER PUBLICATIONS

The Fisher Catalog showing filter membranes, pp. 879–882, 1995/96 (no month).

*Primary Examiner*—Blaine R. Copenheaver
*Attorney, Agent, or Firm*—Douglas B. Little; Melanie Gover

[57] ABSTRACT

Coated porous materials that exhibit air permeability and repellency to liquids having a surface tension at least equal to or greater than 20 dynes/cm which are suitable for making ileostomy vent filters, transdermal drug substrates, agricultural and medical apparel, as well as paint and chemical protective garments. The coating for the porous material is applied as a curable composition containing fluorocarbon urethane precursors which are cross-linked in situ.

13 Claims, No Drawings

COATED POROUS MATERIALS

FIELD OF THE INVENTION

This invention relates to coated porous materials that exhibit air permeability and repellency to liquids having a surface tension at least equal to or greater than 20 dynes/cm.

BACKGROUND OF THE INVENTION

Films, fabrics, and fibrous substrates including textiles have been treated with fluorochemical uncrosslinked urethanes to impart water and soil repellency.

Microporous films prepared by thermally-induced phase separation (TIPS) methods are known. U.S. Pat. Nos. 4,539,256 (Shipman), 4,726,989 and 5,120,594 (Mrozinski) and 5,260,360 (Mrozinski et al.) describe such films containing a multiplicity of spaced, randomly dispersed, equiaxed, nonuniform shaped particles of a thermoplastic polymer, optionally coated with a liquid that is immiscible with the polymer at the crystallization temperature of the polymer. Micropores allow permeability to gases, including moisture vapor, but can be impermeable to high surface tension liquids such as water.

Microporous membranes have been coated with a urethane such that the pores are filled and the membrane is impervious to passage of gases. On the other hand, U.S. Pat. No. 5,286,279 describes a gas permeable membrane coated with a fluorochemical urethane wherein the urethane is prepared from either 1,4-cyclohexane diisocyanate or methane 4,4'-diphenyl diisocyanate.

SUMMARY OF THE INVENTION

The present invention fills a need by employing a precursor fluorocarbon urethane composition or curable coating composition to coat a porous material, e.g. a microporous polyolefin membrane. The urethane precursors are crosslinked in situ, upon drying, in such a way that the pathways through the membrane are not blocked or plugged with a coating. As a result, resistance to airflow and bubble point pore size values are retained after coating. Because the coated membrane is highly breathable, durable, and has a low surface energy, it is useful for making ileostomy vent filters, transdermal drug substrates, agricultural and medical apparel, as well as paint and chemical protective garments.

Accordingly, the present invention in its first aspect is a curable coating composition for a porous material containing fluorocarbon urethane precursors including:

(a) a polyisocyanate;

(b) a polyhydric alcohol; wherein at least one member of (a) or (b) has a functionality of greater than 2, and (c) a perfluoroalkyl alcohol of the formula

$$R\text{—}(CH_2)_x\text{-OH}, \quad (I)$$

in which R is

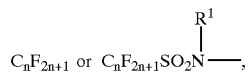

$$C_nF_{2n+1} \text{ or } C_nF_{2n+1}SO_2N\text{—},$$

where x is 1–12; n is 3–20, and $R^1$ is H, alkyl of 1–4 carbon atoms or $(CH_2)_x$-OH, wherein said composition is capable of crosslinking.

A second aspect of the present invention is a coated porous material which includes a porous material and a curable coating composition applied to said material which includes the following fluorocarbon urethane precursors:

(i) a polyisocyanate;

(ii) a polyhydric alcohol; wherein at least one member of (i) or (ii) has a functionality of greater than 2, and (iii) a perfluoroalkyl alcohol of the formula

$$R\text{—}(CH_2)_x\text{-OH}, \quad (I)$$

in which R is

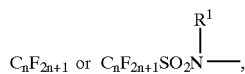

$$C_nF_{2n+1} \text{ or } C_nF_{2n+1}SO_2N\text{—},$$

where x is 1–12; n is 3–20, and $R^1$ is H, alkyl of 1–4 carbon atoms or $(CH_2)_x$-OH.

Another aspect of the present invention is a process or method of making a coated porous material which includes the following steps:

applying a curable coating composition which includes the above defined fluorocarbon urethane precursors, in an organic solvent, on a porous material to cover the material, and drying the resulting coating sufficiently to remove the solvent and promote cross-linking or curing, to produce the coated membrane which exhibits air permeability and repellency to liquid having a surface tension at least equal to or greater than 20 dynes/cm.

The inventive porous materials having a cured coating, which include non-woven, woven materials, perforated films and microporous membranes retain their liquid repellency and moisture vapor permeability properties for extended periods in all types of applications.

The microporous polyolefin materials may contain a compatible liquid or diluent such as mineral oil along with the fluorocarbon urethane coated material and are referred to as (oil-in) materials. Such a fluorocarbon urethane coating on an oil-in polyolefin membrane provides the membrane the ability to resist wetting by fluids like alcohols, toluene, mineral oil, water-surfactant solutions and ethylene glycol even though the membrane's pore walls are coated with approximately 35–40 wt-% mineral oil or another diluent. The same coating on a polyolefin membrane having no diluent (oil-out) or on other membranes or materials not prepared by thermally induced phase separation (TIPS) provides materials displaying even more repellency such that the coated materials resist wetting by all of the above-mentioned fluids as well as chlorohydrocarbons such as trichloroethane, and hydrocarbons such as decane, octane, heptane and hexane.

The present coated porous materials having a cured coating are repellent to a wide variety of fluids including the above organic fluids and are much more repellent than membranes containing prior fluorocarbon coatings such as the fluorocarbon oxazolidinone coatings on polyolefin membranes described in U.S. Pat. No. 5,260,360.

DETAILED DESCRIPTION

Coated and cured porous materials, e.g. microporous polyolefin membrane materials, of the present invention, exhibit significant air permeability properties and repel aqueous-based as well as non-aqueous based liquids including a wide variety of non-aqueous liquids having a surface tension at least equal to or greater than 20 dynes/cm.

Porous materials of the present invention having a cured coating exhibit durability of their fluid repellency properties when subjected to rubbing, touching, folding, flexing or abrasive contact. They also display oleophobic properties, resisting penetration by oils and greases and some (eg. those made from polyethylene (PE), polypropylene (PP) or PE/PP blends) may be heat sealable. For the oil-in version of the invention, the oleophobicity and heat sealing properties of the membrane materials are most surprising since the membrane materials contain an oily, oleophilic processing compound which, a priori, one would expect, would promote wetting by other oleophilic materials and which also would inhibit heat sealing.

Transport of a liquid challenge through most porous materials or fabrics occurs because the liquid is able to wet the material. A possible route through the material is for the liquid to initially wet the surface of the material and to subsequently enter pore openings at the surface of the material followed by a progressive wetting of and travel through interconnected pores until finally reaching the opposite surface of the material. If the liquid has difficulty wetting the material, liquid penetration into and through the material will, for the most part, be reduced. A similar phenomenon occurs in the pores, where reduced wetability, in turn, reduces pore invasion. Generally the greater the numerical difference between the liquid surface tension of the liquid and the surface energy of the porous material (the latter being lower), the less likely it is that the liquid will wet the porous material.

In the case of aqueous solutions containing surface active agents (eg. surfactants) the wetting of the porous materials is usually time-dependent, controlled by the slow diffusion and absorption of surfactants onto the surface of the porous materials.

In the present invention, the extent of barrier protection may be described by four levels, of which the first two describe existing levels and the last two describe levels of protection as a result of the coatings presented by this invention.

Level 1 TIPS membranes without diluents (polypropylene (PP), or high density polyethylene (HDPE)) TIPS membranes with diluents, particle-filled membranes, and polytetrafluoroethylene (PTFE) membranes. In terms of repellency beyond water, these materials immediately wet through with a 0.1 wt. % surfactant, Triton X-1000/water solution with a surface tension of 30 dynes/cm under a constant pressure of 69 kpa (10 psi). These microporous materials also wet easily with mineral oil and solvents like alcohol, toluene, methylethyl ketone (MEK) and the like.

Level 2 TIPS oil-in PP membranes containing fluorocarbon oxazolidinone (FCO) as a melt additive or a topical coating. These membranes prevent penetration of the above surfactant/water solution for 32 minutes at 69 kpa (10 psi). They also resist wetting by methyl alcohol and water/isopropyl alcohol mixtures (IPA) (up to 80% IPA), but are wetted by pure IPA, toluene, MEK, and other solvents.

Level 3 TIPS oil-in PP membranes with a fluorocarbon-urethane coating presented by this invention. These materials do not allow flow of the above surfactant/water solution through the membrane in over three days of continuous testing under a constant pressure of 69 kpa (10 psi). In addition, these materials resist wetting by any alcohol, toluene, ethylene glycol, ethyl acetate, and by a number of concentrated surfactants.

Level 4 TIPS diluent-free (or oil-out) membranes, PTFE, particle-filled membranes, polyamides and other polymer membranes with a fluorocarbon-urethane coating of the present invention. These materials resist wetting (except under high pressure) by surfactants, alcohol, MEK, toluene, dodecane, decane, octane, heptane, and hexane.

The oleophobic, hydrophobic, moisture permeable, air permeable, coated porous materials of the present invention may be prepared by topically applying a fluorocarbon urethane precursor, the curable coating composition, to a porous material through spray or roll-on application, through dip coating or transfer coating techniques. Following the application, the coating is dried sufficiently to remove solvent and to promote cross-linking or curing of the fluorocarbon urethane coating membrane.

By porous material, it is meant that a material has a pore size less than about 250 micrometers. Preferably the pore size is from about 0.01 to about 250 micrometers. The materials include non-woven and woven materials and perforated films. Porous polymeric materials include polyurethane, polyesters, polycarbonates, polyamides, and preferably polytetrafluoroethylene (PTFE) and polyolefins. The polymeric materials may also be referred to as microporous membranes.

Examples of membranes which are made by thermally induced phase separation include crystalline or crystallizable polyolefin membranes described, for example, in U.S. Pat. No. 4,539,256 (Shipman), U.S. Pat. No. 4,726,989 (Mrozinski), U.S. Pat. No. 4,863,792 (Mrozinski), U.S. Pat. No. 4,824,718 (Hwang), U.S. Pat. No. 5,120,594 (Mrozinski) and U.S. Pat. No. 5,260,360 (Mrozinski) each of which is incorporated herein by reference.

An example of a perforated films is the plain surface, polycarbonate, Track-etch membrane filter screens available from Poretics Corporation, of Livermore, Calif.

Further, the curable coating compositions can be topically applied to materials such as stretched PTFE, as mentioned above, or particle loaded films which do not contain a diluent or compatible liquid (oil-out). The compatible liquid may be removed from the microporous polyolefin sheet material, either before or after orientation, to form a diluent-free microporous polymeric material. The compatible liquid can be removed by, for example, solvent extraction, volatilization, or any other convenient method.

Crystallizable olefin polymers suitable for use in the preparation of coated microporous membrane materials of the present invention are melt processable under conventional processing conditions. That is, on heating, they will easily soften and/or melt to permit processing in conventional equipment, such as an extruder, to form a sheet, tube, filament or hollow fiber. Upon cooling the melt under controlled conditions, suitable polymers spontaneously form geometrically regular and ordered crystalline structures. Preferred crystalizable olefin polymers for use in the present invention have a high degree of crystallinity and also possess a tensile strength of at least about 689 kpa (100 psi).

Examples of suitable commercially available crystallizable polyolefins include polypropylene, block copolymers or other copolymers of ethylene and propylene, or other polymers, such as polyethylene, polypropylene and polybutylene polymers which can be used singularly or in a mixture.

Materials suitable as processing compounds for blending with the crystallizable polymer to make the microporous membrane materials of the present invention are liquids or solids which are not solvents for the crystallizable polymer at room temperature. However, at the melt temperature of the crystallizable polymer the compounds become good solvents for the polymer and dissolve it to form a homogeneous solution. The homogeneous solution is extruded through, for example, a film die, and on cooling to or below the crystallization temperature of the crystallizable polymer, the solution phase separates to form a phase separated film.

Preferably, these second phase compounds have a boiling point at atmospheric pressure at least as high as the melting temperature of the polymer. However, compounds having lower boiling points may be used in those instances where superatmospheric pressure may be employed to elevate the boiling point of the compound to a temperature at least as high as the melting temperature of the polymer. Generally, suitable compounds have solubility parameter and a hydrogen bonding parameter within a few units of the values of these same parameters for the polymer.

Some examples of blends of olefin polymers and processing compounds which are useful in preparing microporous materials in accordance with the present invention include; polypropylene with mineral oil, dibenzylether, dibutyl phthalate, dioctylphthalate, or mineral spirits; polyethylene with xylene, decalin, decanoic acid, oleic acid, decyl alcohol, diethyl phthalate, dioctyl phthalate, mineral oil or mineral sprits, and polyethylene-polypropylene copolymers with mineral oil or mineral spirits. Typical blending ratios are 20 to 80 weight percent polymer and 20 to 80 weight percent blending compound.

A particular combination of polymer and processing compound may include more than one polymer, i.e., a mixture of two or more polymers, e.g. polypropylene and polybutylene, and/or more than one blending compound. Mineral oil and mineral spirits are examples of mixtures of processing compounds, since they are typically blends of hydrocarbon liquids. Similarly, blends of liquids and solids may also serve as the processing compound.

The curable coating composition or fluorocarbon urethane precursors include a combination of polyisocyanate, a polyhydric alcohol and a perfluoroalkyl alcohol as above defined. These components are mixed in an organic solvent and the resulting solution is applied as above described to the polyolefin membrane. The composition contains at least equimolar amounts of polyisocyanate and alcohol. Preferably, an excess of polyisocyanate may be used.

As the polyfunctional isocyanate component employed in the curable coating composition of the present invention, various compounds may be employed without any particular restrictions, so long as they are bifunctional or of higher functionality. Preferred polyisocyanates are di or tri-functional isocyanates. For example, di-functional isocyanate compounds may include aromatic isocyanates such as 2,4-toluenediisocyanate, 4,4'-diphenylmethanediisocyanate, tolidinediisocyanate and dianisidinediisocyanate; alicyclic diisocyanates such as 2-methyl-cyclohexane-1,4-diisocyanate, isophoronediisocyanate and hydrogenated MDI

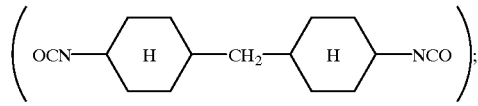

and aliphatic diisocyanates such as hexamethylenediisocyanate and decamethylenediisocyanate. These compounds may be represented by the formula OCN—Y—NCO. When two OCN—Y—NCO are reacted in the presence of water, a dimer of the formula OCN—Y—NHCONH—Y—NCO will be formed. The difunctional isocyanate compounds include such dimers. Another difunctional isocyanate is

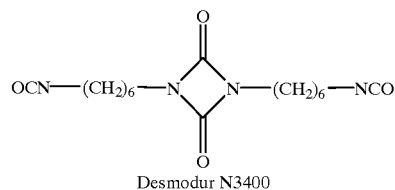

Desmodur N3400

In addition to the difunctional isocyanate compounds, polyfunctional isocyanate compounds such as trifunctional, tetrafunctional or pentafunctional isocyanate compounds may be mentioned. Specific examples of trifunctional isocyanate compounds include, in addition to the after-mentioned compounds, a trimer of the formula

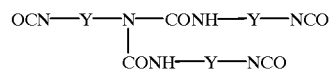

obtained by reacting the above-mentioned dimer of the formula OCN—Y—NHCONH—Y—NCO with a monomer of the formula OCN—Y—NCO. Examples of other trifunctional isocyanate compounds include:

Desmodur N-100

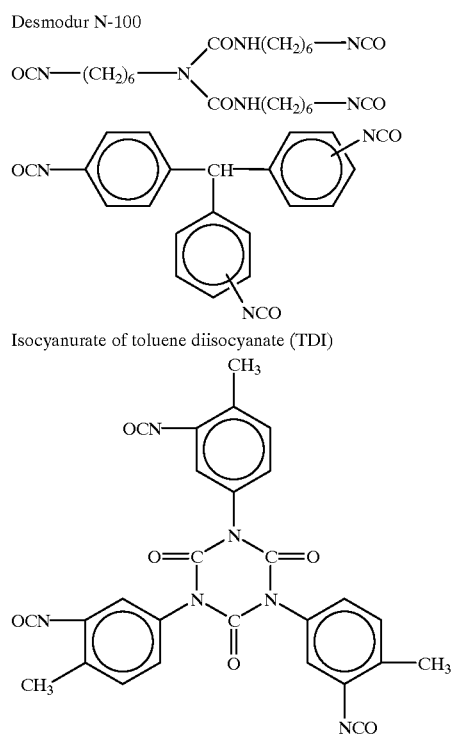

Isocyanurate of toluene diisocyanate (TDI)

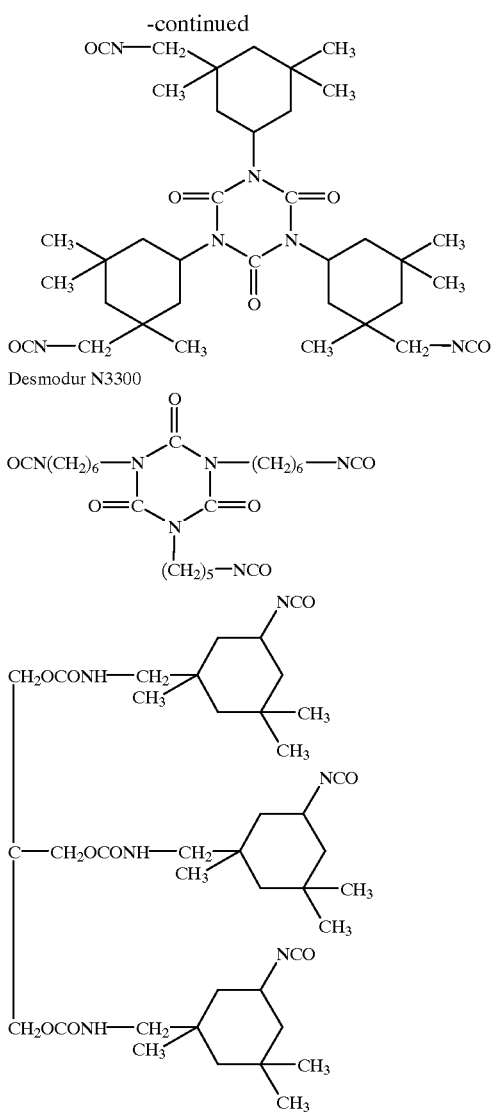

The polyhydric alcohol includes any multifunctional monomer alcohol having at least two hydroxyl groups. Preferred polyhydric alcohols are those having 2 to 8 carbon atoms and preferably being a diol or triol. Particularly useful are, for example, 1,4-butane diol, neopentyl glycol or trimethylol propane.

Preferred perfluoroalkyl alcohols are those of formula I, defined above, wherein R is

in which x is 1–4, and $R^1$ is methyl, ethyl or —$CH_2OH$.

Most preferred is the alcohol of formula I wherein R is $C_nF_{2n+1}$, $SO_2$—N—$R^1$ in which n is 8, and x is 2 and $R^1$ is methyl.

The above components of the curable coating composition are combined in a solvent in which the solution contains from about 2 to about 40 wt-% solids, preferably from about 5–10 wt-% solids. A most preferred composition contains about 7 wt-% solids. This solution is applied as described above to the porous material.

An optional ingredient to enhance the crosslinking of the components of the curable coating composition is a catalyst. Such catalysts are well-known in the art and may include (a) tertiary amines;
(b) tertiary phosphines;
(c) strong bases;
(d) acidic metal salts of strong acids;
(e) chelates of various metals;
(f) alcoholates and phenolates of various metals;
(g) salts of organic acids with a variety of metals such as alkali metals, alkaline earth metals;
(h) organometallic derivatives of tetravalent tin, trivalent and pentavalent As, Sb, and Bi and metal carbonyls of iron and cobalt.

Organotin compounds deserve particular mention as catalysts for catalyzing the urethane forming reaction. These compounds include the dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly, there may be used a trialkyltin hydroxide, dialkytin oxide, dialkytin dialkoxide or dialkyltin dichloride. Examples of these compounds include trimethyltin hydroxide, tributyltin hydroxide, trioctyltin hydroxide, bitutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like. Particularly useful for the present invention is dibutyltin dilaurate.

As an organic solvent used to facilitate the application of the precursors, the following may be used: an ether such as dioxane, tetrahydrofuran, ethyl propyl ether; an amide such as formamide, dimethylformamide or acetamide; ketones such as acetone, methyl ethyl ketone, methyl isopropyl ketone or methyl isobutyl ketone; and esters such as methyl acetate, ethyl acetate, propyl acetate or butyl acetate. Such an organic solvent is added usually in an amount of from about 60 to about 98 wt-%, preferably about 90–95 wt-%. The most preferred amount of solvent is about 93 wt-% of the total of coating precursors, and the preferred solvent employed is a ketone such as methyl ethyl ketone.

Certain conventional additive materials may also be blended in limited quantities with the curable coating composition. Additive levels should be chosen so as not to interfere with the formation of the microporous membrane material or to result in unwanted exuding of the additive. Such additives may include, for example, dyes, pigments, plasticizers, UV absorbers, antioxidants, bactericides, fungicides, ionizing radiation resistant additives, and the like. Additive levels should typically be less than about 10% of the weight of the polymer component, preferably less than about 2% by weight.

An additional aspect of the present invention is the use of at least one surfactant which may be applied onto the porous material as a precoat or made part of the curable coating composition.

The surfactant adds hydrophilic character to the porous material and decreases the interfacial tension of a liquid or liquid system against the surface of the pores within a porous material. Normally any surfactant used will be a wetting agent which will facilitate the surface of the pores within a membrane being wetted by water. If desired, a mixture of different wetting agents may be employed in any specific application.

Accordingly, any surfactant which, when applied to the porous material (i.e., in the absence of the coating polymer), lowers the surface tension thereof to the extent that the substrate will exhibit a contact angle with water of less than about 80°, preferably less than about 60°, will render said substrate hydrophilic and can be employed in conjunction with the coating polymer.

Surfactants used may be a nonionic, cationic, or anionic type, or a combination of two or more of these surfactants.

Examples of nonionic surfactants are: polyol fatty acid monoglyceride, polyoxyethylene fatty acid ester, polyoxyethylene sorbitan fatty acid ester, polyoxyethylene alkyl ether, polyoxyethylene alkyl allyl ether, and polyoxyethylene alkylether phosphate.

Examples of cationic surfactants are: quaternary ammonium salts, polyoxyethylene alkylamines, and alkylamine oxides.

Examples of anionic surfactants are: alkylsulphonates, alkylbenzene sulphonates, alkylnaphthalene sulphonates, alkylsulphosuccinates, alkylsulphonate ester salts, polyoxyethylene alkyl sulphonate ester salts, alkyl phosphates, and polyoxyethylene alkyl phosphates.

A preferred nonionic surfactant is, for example, polyethylene glycol monostearate. A preferred anionic surfactant is dioctyl sodiumsulfosuccinate.

In the following non-limiting examples, all parts and percentages are by weight unless otherwise indicated. In evaluating the materials of the invention and the comparative materials, the following test methods are used.

Gurley time is also inversely related to average pore size of the test specimen.

Example 1

A coating solution was prepared by mixing 38.5 g 1,6-hexane diisocyanate biuret (Desmodur™ N-75, Bayer, Philadelphia, Pa.), 56.8 g N-methyl-N-2-hydroxyethylperfluorooctylsulfonamide (available from Minnesota Mining and Manufacturing Company (3M), St. Paul, Minn.) and 4.7 g 1,4-butanediol (Aldrich Chemical Co., Milwaukee, Wis.) in 1390 g methyl ethyl ketone (MEK, Aldrich) to make a 7.0 weight percent solids solution. The solution was stirred and mixed with 0.5 g dibutyltin dilaurate (Aldrich), then applied to two different microporous membranes using a rotogravure coating process and a gravure roll having small indentations in its surface shaped like inverted pyramids. There were approximately 35 lines (of inverted pyramids) per inch (14 lines per cm) each pyramid being about 0.25 mm deep and having an internal tooth angle (angle between two edges of pyramid measured in the plane of one pyramid surface at the apex) of 90°, and the land area between inverted pyramids comprised about 50% of the gravure roll surface. The membranes were conveyed through the gravure roll apparatus at a rate of 3 m/min. Membrane 1A was a 0.04 mm thick polypropylene membrane ("oil-in" KN 9400™ porous film, 3M) and membrane 1B was a 0.05 mm thick polyethylene membrane ("oil-out" Cotran™ membrane, 3M) supported on a silicone release liner. After coating, each membrane was dried in an oven at 99° C. to remove MEK solvent and crosslink the urethane coating. Properties of the coated membranes are shown in Table 1.

| Example | Coating Add-On, wt % | Gurley No., sec/50 cm³ | Pore size micrometers | Water/IPA resistance[A] | Oil/Heptane resistance[B] |
|---|---|---|---|---|---|
| 1A Comp | 0 | 56 | 0.26 | 2 | 0 |
| 1A | 15 | 60 | 0.25 | 10 | 2–3 |
| 1B Comp | 0 | 12 | 0.34 | 1 | 0 |
| 1B | 30 | 17 | 0.32 | 10 | 6 |

[A]values range from 1–10, where 1 means a membrane resisted wetting by a 10 wt. % aqueous solution of isopropyl alcohol (IPA) for 30 seconds and 10 means a membrane resisted wetting by pure IPA
[B]values range from 0–8. 1 means the membrane resisted wetting by 100% mineral oil for 30 seconds, 2 means a membrane resisted wetting by a 65:35 oil:hexadecane mixture, and 8 means a membrane resisted wetting by 100% heptane for 30 seconds.

EXAMPLES

Test Methods

"Gurley time" is measured by means of densometer number (i.e., flow-through time) of at least 2 seconds for 50 cc of air at 124 mm (4.88 in.) H₂O pressure to pass through a sample of the web having a circular cross-sectional area of approximately 645 mm² (1 square inch). A temperature of approximately 23°–24° C. (74°–76° F.) and 50 percent relative humidity are maintained for consistent measurements. The "Gurley" densometer or flow-through time may be measured on a densometer of the type sold under the trade designation "Model 4110" densometer by W. & L. E. Gurley of Troy, N.Y., which is calibrated and operated with a Gurley Teledyne sensitivity meter (Cat. No. 4134/4135). The "Gurley" densometer time is determined in a manner similar to a standard test of the Technical Association of the Pulp and Paper Industry of Atlanta, Ga., for measuring the air resistance of paper (TAPPI Official Test Method T 460 om-B3 (which is incorporated herein by reference). Gurley time is inversely related to void volume of the test specimen of web.

Table 1 shows that a fluorourethane coating of the invention increases membrane resistance to wetting by both water and oil, whether the membrane is "oil-in" (i.e., Example 1A) or "oil-out" (Example 1B) without reducing breathability (Gurley Number) too much and without filling pores of the membrane. In addition, the table shows that coatings of the invention are effective on both polypropylene and polyethylene membranes.

Example 2

A coating solution was prepared as described in Example 1 by mixing 35.1 g 1,6-hexane diisocyanate biuret (Desmodur N-75, Bayer) diisocyanate, 51.3 g N-methyl-N-2-hydroxyethyl-perfluorooctylsulfonamide, 12.2 g polyethylene glycol 400 monostearate (Aldrich) and 1.4 g 1,4-butanediol in 1329 g methyl ethyl ketone to make a 7.0 weight percent solids solution. The solution was stirred and mixed with 0.5 g dibutyltin dilaurate then applied to a 0.05 mm thick polyethylene membrane ("oil-out" Cotran™ membrane, 3M Co.) supported on a silicone release liner, dried and crosslinked. Coating weight was approximately 30 wt. %. Properties of the coated membrane are shown in Table 2.

TABLE 2

| Example | Gurley No., sec/50 cm$^3$ | Pore size micrometers | Water/IPA resistance$^A$ | Oil/Heptane resistance$^B$ |
|---|---|---|---|---|
| 2 Comp | 12 | 0.34 | 1 | 0 |
| 2 | 17 | 0.32 | 10 | 8 |

A, B as described in Table 1

The data of Table 2 show that a chain-extended fluorourethane provided increased oil/heptane resistance (compared to Example 1B) over that provided by a non-chain extended fluorourethane.

Example 3

A solution of 44 g polyhydroxyl polyether (Pluracol™ PEP 550, BASF Corp., Mt. Olive, N.J.), 94 g N-methyl-N-2-hydroxyethyl-perfluorooctylsulfonamide and 150 g Desmodur™ N-75 diisocyanate in 2212 g methyl ethyl ketone was stirred and mixed with 2.5 g Irganox™ 1010 antioxidant (Ciba-Geigy, Ardsley, N.Y.) and 2.5 g dibutyltindilaurate to make a 100 by weight solution of isocyanate/polyol. The solution was coated onto porous polyethylene membrane (3M, St. Paul, Minn.) from a dip pan onto a trihelical gravure cylinder (40 lines/2.54 cm) having a volume factor of 51 micrometers and a tooth angle of 135°. Coating speed was 3.65 m/min after which the saturated membrane was heated in three successive ovens at 104° C. (total residence time 4 minutes) to complete the polyurethane formation. Initial membrane weight was 4.5 g/m$^2$ and final, cured coated membrane weight was 6.75 g/m$^2$.

The coated membrane had a moisture vapor transmission rate (MVTR) that was 95% of the original uncoated film. Gurley porosity of the uncoated film was 14 sec/50 cc, and that of the coated film was 142 sec/50 cc. The coated film was not wet by toluene, octane, ethyl acetate and isopropyl alcohol, and it was wet by heptane, ethylether and Freon™ 113.

Example 4

Effect of Various Formulations on Performance

In order to evaluate certain polyurethane formulations, several isocyanates, aliphatic diols, and fluorocarbon alcohols were formulated into coatings for oil-in, oil-out and laminated porous membranes. The results are shown in Table 4. In Table 4:

D-75N was Desmodur 75N™, the trifunctional biuret of hexane diisocyanate (Bayer Corp., Pittsburgh, Pa.)

D-I was Desmodur I™, toluene diisocyanaate (Bayer Corp.)

D-W was Desmodur W™, methane bis(4,4'-isocyanatocyclohexane) (Bayer Corp.)

MDI was methane bis(4,4'-isocyanatobenzene)

D-H was Desmodur H™, 1,6-hexanediisocyanate (Bayer Corp.)

BDO was 1,4-butane diol

TMP was trimethylolpropane

N-MeFOSE was N-methyl-N-(2-hydroxyethyl) perfluorooctane sulfonamide (3M, St. Paul, Minn.)

Zonyl Ba-N™ was perfluoroalkyl ethyl alcohol (DuPont Chemical Co., Wilmington, Del.)

Oil-out PP film was prepared according to U.S. Pat. No. 5,120,594, Example 1, incorporated by reference; pre-coating Gurley=10–12; W=3; O=0 Oil-in PP film was KN 9400™ microporous film (3M Company); precoating Gurley=80–125; W=3; O=0 Gurley numbers were as described supra, in units of sec/50 cc O and W refer to resistance to Oil and Water, respectively, as described for Table 1, supra Laminate refers to a single-ply oil-in KN 9400™ film laminated with a 1 ounce polypropylene spunbonded web (Polybond, Inc., Waynesboro, Va.) as described in U.S. Pat. No. 5,260,360, Example 17, incorporated by reference; for formulation 4B Laminate, Gurley=439 for formulation 4B Laminate, coated twice, W=10, O=4, Gurley=1140 for formulation 4I Laminate, Gurley=336 for formulation 4I Laminate, coated twice, W=10, Gurley=1403

Data in Table 4 shows that post-coating resistance was approximately the same for almost every formulation, and it was improved significantly over pre-coated values. In one example each, both N-ethyl FOSE and Zonyl™ BA-N appeared to provide slightly less post-coating resistance than precoated or uncoated films, for both oil and water on both oil-in and oil-out films.

TABLE 4

EFFECT OF VARIOUS FORMULATIONS ON PERFORMANCE

| | Isocyanate, g | | | | | Aliphatic Diol, g | | Fluoroalcohol, g | | | Films, After Coating | | | | | | | |
|---|---|---|---|---|---|---|---|---|---|---|---|---|---|---|---|---|---|---|
| | | | | | | | | | | | Oil-out PP | | | Oil-in PP | | | Laminate | |
| | | | | | | | | | | | | Resistance | | | Resistance | | | |
| Sample | D-75N | D-I | D-W | MDI | D-H | BDO | TMP | N-Me FOSE | N-Et FOSE | Zonyl™ BA-N | Gurley | W | O | Gurley | W | O | W | O |
| 4A | 825 | | | | | | 67 | 838 | | | 12.6 | 10 | 6 | 128 | 10 | 3 | | |
| 4B | 825 | | | | | 68 | | 838 | | | 12.0 | 10 | 6 | 84.5 | 10 | 3 | 10 | 3 |
| 4C | | 383 | | | | | 67 | 838 | | | 12.2 | 9 | 6 | 157 | 9 | 3 | | |
| 4D | | | 396 | | | | 67 | 838 | | | 12.6 | 9 | 6 | 156 | 9 | 3 | | |
| 4E | | | | 429 | | | 67 | 838 | | | 25.1 | 10 | 8 | 1048 | 10 | 3 | | |
| 4F | | | | | 252 | | 67 | 838 | | | 20.3 | 10 | 8 | 235 | 10 | 3 | | |
| 4G | | | | | 504 | 203 | | 838 | | | 37.3 | 10 | 8 | 1200 | 10 | 3 | | |
| 4H | 825 | | | | | 68 | | | | 860 | 12.9 | 6 | 6 | 209 | 5 | 2 | | |
| 4I | 577.5 | | | | | 68 | | 838 | | | 13.0 | 10 | 6 | 180 | 10 | 2 | 10 | 2 |
| 4J | 825 | | | | | 68 | | | | 771 | 22.0 | 10 | 6 | 180 | 5 | 1 | | |

TABLE 4-continued

EFFECT OF VARIOUS FORMULATIONS ON PERFORMANCE

| | Isocyanate, g | | | | | Aliphatic Diol, g | | Fluoroalcohol, g | | | Films, After Coating | | | | | | | |
|---|---|---|---|---|---|---|---|---|---|---|---|---|---|---|---|---|---|---|
| | | | | | | | | N-Me | N-Et | Zonyl ™ | Oil-out PP | | | Oil-in PP | | | Laminate | |
| | | | | | | | | FOSE | FOSE | BA-N | | Resistance | | | Resistance | | | |
| Sample | D-75N | D-I | D-W | MDI | D-H | BDO | TMP | | | | Gurley | W | O | Gurley | W | O | W | O |
| 4K | 1650 | | | | | 68 | | 838 | | | 12.3 | 10 | 6 | 170 | 10 | 2 | | |
| 4L | 275 | | | | | 45 | | 559 | | | 12.8 | 10 | 6 | 170 | 10 | 2 | | |

Example 5
Effect of Coating on Various Substrates

In order to demonstrate the effectiveness of fluorourethane coatings on a number of microporous membranes, a standard mixture of 3.0 equivalents Desmodur N-75™ (Bayer Corp.), 1.5 equivalents N-methyl FOSE (3M), and 1.5 equivalents 1,4-butanediol (Aldrich Chemical Co.) in methyl ethyl ketone solvent, at the percent solids shown in Table 5, was prepared, and membranes were coated as described in Example 1. In some cases (5F, 5M-O, 5R) a surfactant was added to the coating solution, which generally increased wetting of the membrane, increasing coating effectiveness. Samples 5P and 5Q describe a membrane prepared by melt-blending a waxy surfactant with the polypropylene/mineral oil nucleating agent mixture to prepare a hydrophilic membrane prior to solution-coating the polyurethane precursor solution. Samples 5G and 5H were coated with the urethane precursor solution, dried, then re-coated (hence the designation "2X." In Table 5:

Oil-in PP refers to KN 9400™ microporous film (3M Company);

Oil-out PP refers to microporous film prepared according to U.S. Pat. No. 5,120,594, Example 1;

PEGML 200 refers to poly(ethylene glycol) monolaurate surfactant of MW 200 (Aldrich);

Laminate refers to a single-ply oil-in KN 9400™ film laminated with a 1 ounce polypropylene spunbonded web (Polybond, Inc., Waynesboro, Va.) as described in U.S. Pat. No. 5,260,360, Example 17;

PEGMS 400 refers to a poly(ethylene glycol) monostearate surfactant of MW 400 (Aldrich);

TYVEK™ refers to a spunbonded polyethylene material (DuPont Co.);

EXXAIRE™ refers to a particle-filled polyethylene membrane (Exxon Chemical Co.);

SONTARA™ refers to a woven fabric comprising cellulose and poly(ethylene terphthalate) fibers (DuPont)

Porous PTFE refers to a poly(tetrafluoroethylene) membrane, Gurley=5 sec/50 cc, (Tetratec Corp., Feasterville, Pa.).

DOS[3] refers to dioctyl sodiumsulfosuccinate (Aldrich)

The data in Table 5 show that, for essentially any type of surfactant, using a surfactant in the urethane-precursor coating solution or coating on an oil-out membrane prior to treating with urethane-precursor solution improves wetting, hence improves oil and water resistance of the coated membrane over membranes coated in the absence of a surfactant. For oil-in membranes, melt blending a surfactant in the extrusion formation process (rather than coating with a surfactant on an oil-in membrane prior to treating with urethane precursor solution) results in improved water and oil resistance, compare Sample 5O (melt) to 5G (topical).

TABLE 5

Effect of Coating on Various Substrates

| Sample | Description | Min. Oil, % + additive % | Solution Solids, % | Gurley Before cm/50 cc | Gurley After cm/50 cc | W/IPA Before | W/IPA After | Oil/Hept Before | Oil/Hept After |
|---|---|---|---|---|---|---|---|---|---|
| 5A | Oil-in PP (3M) | 27 | 7 | 80 | 85 | 3 | 10 | 0 | 3 |
| 5B | " | 27 | 7 | 120 | 213 | 3 | 10 | 0 | 3 |
| 5C | " | 27 | 20 | 120 | 450 | 3 | 10 | 0 | 3 |
| 5D | " | 27 | 40 | 120 | >5000 | 3 | 10 | 0 | 4 |
| 5E | " | 27 | 2 | 120 | 125 | 3 | 10 | 0 | 1 |
| 5F | Oil-in PP 2X | 27 | 7 | 295 | 510 | 3 | 10 | 0 | 2 |
| 5G | Oil-in PPP + PEGML 200 | 27 | 7 | 120 | 300 | 3 | 9 | 0 | 1 |
| 5H | Oil-out PP (3M) | 0 | 7 | 12 | 12 | 3 | 10 | 0 | 6–7 |
| 5I | " | 0 | 20 | 12 | 20 | 3 | 10 | 0 | 6–7 |
| 5J | " | 0 | 40 | 12 | 240 | 3 | 10 | 0 | 6–7 |
| 5K | " | 0 | 2 | 12 | 12 | 3 | 8 | 0 | 4 |
| 5L | Oil-out PP + FC-13876 | 0 | 7 | 12 | 13 | 3 | 10 | 0 | 8 |
| 5M | Oil-out PP + PEGML 200 | 0 | 7 | 12 | 13 | 3 | 10 | 0 | 7–8 |
| 5N | Oil-out PP + PEGMS 400 | 0 | 5 | 12 | 15 | 3 | 10 | 0 | 8 |
| 5O | Oil-in PP + PEGML 200 melt | 37 + 3 | 7 | 25 | 47 | 0 | 10 | 0 | 2 |
| 5P | Oil-in PP + PEGMS 400 | 27 | 5 | 125 | 155 | 3 | 10 | 0 | 2 |
| 5Q | TYVEK ™ (Dupont) | 0 | 7 | 5 | 3 | 1 | 7 | 0 | 6 |

TABLE 5-continued

Effect of Coating on Various Substrates

| Sample | Description | Min. Oil, % + additive % | Solution Solids, % | Gurley Before cm/50 cc | Gurley After cm/50 cc | W/IPA Before | W/IPA After | Oil/Hept Before | Oil/Hept After |
|---|---|---|---|---|---|---|---|---|---|
| 5R | EXXAIRE ™ (Exxon) | 0 | 7 | 185 | 950 | 3 | 10 | 0 | 6–7 |
| 5S | SONTARA ™ (DuPont) | 0 | 7 | <1 | <1 | 8 | 10 | 5 | 6–7 |
| 5T | Porous PTFE (Tetratech) | 0 | 7 | 5 | 4 | 4 | 10 | 0 | 8 |
| 5U | Oil-out PP + DOS³ before urethane coating | 0 | 7 | 12 | 15 | 3 | 10 | 0 | 8 |
| 5V | Oil-out PP + DOS³ in urethane precursor coating | 0 | 7 | 12 | 15 | 3 | 10 | 0 | 8 |

The above specification, examples and data provide a complete description of the manufacture and use of the composition of the invention. Since many embodiments of the invention can be made without departing from the spirit and scope of the invention, the invention resides in the claims hereinafter appended.

We claim:

1. A coated porous material comprising:
   (a) a porous material having a pore size between 0.01 and 250 micrometers and
   (b) a curable crosslinkable coating composition applied to said material comprising fluorocarbon urethane precursors including:
      (i) a polyisocyanate;
      (ii) a polyhydric alcohol; wherein at least one member of (i) or (ii) has a functionality of greater than 2, and
      (iii) a perfluoroalkyl alcohol of the formula $$R-(CH_2)_x\text{-}OH,$$

in which R is $$C_nF_{2n+1} \text{ or } C_nF_{2n+1}SO_2-\underset{\underset{\displaystyle |}{R^1}}{N}-,$$

where x is 1–12, n is 3–20, and $R^1$ is H, alkyl of 1–4 carbon atoms or $-(CH_2)_x\text{-}OH$, wherein said composition is crosslinked after it is applied to said material and wherein the pore pathways through said material are not blocked or plugged with the coating.

2. The coated material of claim 1, wherein the porous material has a pore size from about 0.1 to about 250 micrometers.

3. The coated material of claim 1, wherein the porous material is a microporous membrane comprising polymeric materials selected from the group consisting of polyolefins, polyurethanes, and polytetrafluoroethylenes.

4. The coated material of claim 3, wherein the polyolefin is polyethylene, polypropylene or a polypropylene-polyethylene copolymer.

5. The coated material of claim 3, wherein the polyolefin is blended with a diluent.

6. The coated material of claim 5, wherein the polyolefin blend is selected from the group consisting of: polypropylene blended with mineral oil, dibenzyl ether, dibutyl phthalate, dioctylphthalate or mineral spirits; polyethylene blended with xylene, decalin, decanoic acid, oleic acid, decyl alcohol, diethylphthalate, dioctyl phthalate, mineral oil or mineral spirits, and polypropylene-polyethylene copolymer blended with mineral oil or mineral spirits.

7. The coated material of claim 5, wherein the diluent is mineral oil, mineral spirits or a mixture thereof.

8. The coated material of claim 1, wherein the porous material is pre-coated with a surfactant.

9. The coated material of claim 8, wherein the surfactant is selected from the group consisting of polyethylene glycol monostearate and dioctyl sodium sulfosuccinate.

10. The coated material of claim 1, wherein the curable coating composition comprises:
    (i) a di- or trifunctional isocyanate, or a mixture thereof;
    (ii) a polyhydric alcohol having 2–8 carbon atoms, and
    (iii) a perfluoroalkyl alcohol
in which R is $$C_nF_{2n+1}SO_2\underset{\underset{\displaystyle |}{R^1}}{N}-,$$

where x is 1–4, and $R^1$ is methyl, ethyl or $CH_2OH$.

11. The coated material of claim 1, wherein the curable coating composition further comprises a surfactant.

12. The coated material of claim 11, wherein the surfactant is a polyethylene glycol monostearate.

13. A coated porous material comprising:
    (a) a porous polymeric material; and
    (b) a cross-linked polyurethane derived from a curable composition comprising:
       (i) a polyisocyanate;
       (ii) a polyhydric alcohol in which at least one member of (i) or (ii) has a functionality of greater than 2; and
       (iii) a perfluoroalkyl alcohol of the formula $$R-(CH_2)_x\text{-}OH,$$

in which R is $$C_nF_{2n+1} \text{ or } C_nF_{2n+1}SO_2\underset{\underset{\displaystyle |}{R^1}}{N}-,$$

where x is 1–12; n is 3–20, and $R^1$ is selected from the group consisting of H, alkyl of 1–4 carbon atoms and $-(CH_2)_x\text{-}OH$.

* * * * *

UNITED STATES PATENT AND TRADEMARK OFFICE
CERTIFICATE OF CORRECTION

PATENT NO. : 5,989,698
DATED : November 23, 1999
INVENTOR(S) : James S. Mronzinski, Malcolm B. Burleigh, Philip D. Radovanovic, and Brain D. Johnson It is certified that error appears in the above-identified patent and that said Letters Patent is hereby corrected as shown below:

Column 1,
Line 64: "atoms or ( CH2)x-OH, wherein" should read --atoms or —(CH2)x-OH, wherein--.

Column 2,
Line 15: "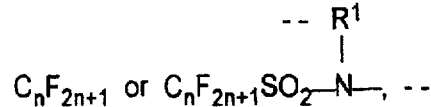" should need

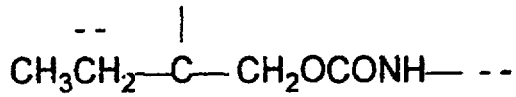

Column 7,
Line 22: In the Formula: "( CH$_2$)$_x$-OH." should read -- —(CH$_2$)$_x$-OH--

Line 32: In the Formula "C— CH$_2$OCONH—" should read

CH$_3$CH$_2$—C— CH$_2$OCONH— --

UNITED STATES PATENT AND TRADEMARK OFFICE
CERTIFICATE OF CORRECTION

PATENT NO.   : 5,989,698
DATED        : November 23, 1999
INVENTOR(S)  : James S. Mronzinski, Malcolm B. Burleigh, Philip D. Radovanovic, and Brain D. Johnson Page 2 of 2

It is certified that error appears in the above-identified patent and that said Letters Patent is hereby corrected as shown below:

Column 11,
Line 23: "100" should read --10%--.

Column 13
Table 5, Row 5G, "PPP" should read --PP--.

Column 15
Line 38: "R—CH2)x-OH," should read --R—(CH2)x-OH,--

Column 16,
Line 62:

$$\text{``}C_nF_{2n+1} \text{ or } C_nF_{2n+1}SO_2\overset{R^1}{\underset{|}{N}}\text{—,''}$$

should read $$-- C_nF_{2n+1} \text{ or } C_nF_{2n+1}SO_2\overset{R^1}{\underset{|}{N}}\text{—, --}$$

Signed and Sealed this

Nineteenth Day of June, 2001

*Attest:*

*Attesting Officer*

NICHOLAS P. GODICI
*Acting Director of the United States Patent and Trademark Office*